UNITED STATES PATENT OFFICE.

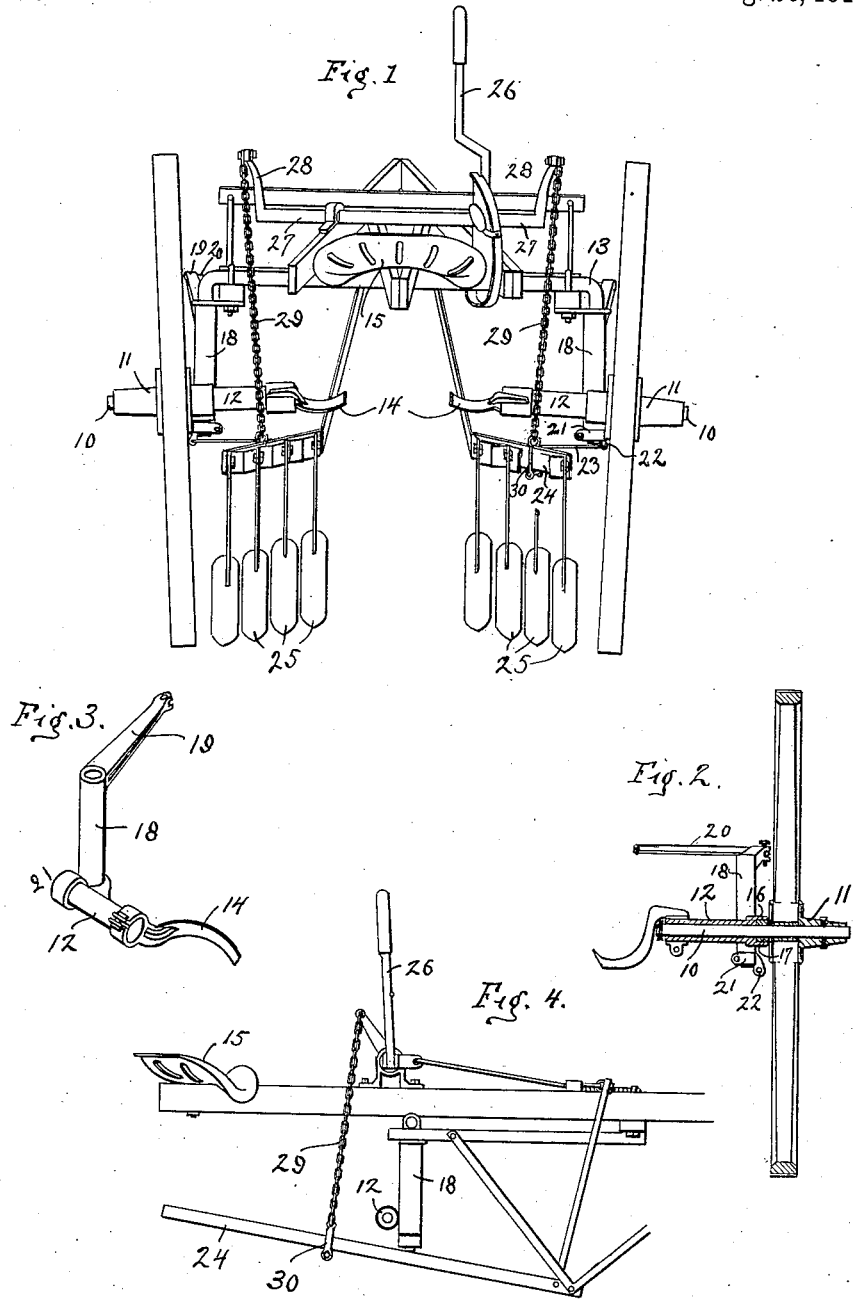

SAMUEL TERRY HUDSON, OF RIVERHEAD, NEW YORK; MARY E. HUDSON AND ADA H. YOUNG EXECUTRICES OF SAID SAMUEL T. HUDSON, DECEASED.

WHEEL-CULTIVATOR.

1,071,639.  Specification of Letters Patent.  Patented Aug. 26, 1913.

Application filed May 14, 1910. Serial No. 561,492.

*To all whom it may concern:*

Be it known that I, SAMUEL TERRY HUDSON, a citizen of the United States, residing at Riverhead, county of Suffolk, and State of New York, have invented an Improvement in Wheel-Cultivators.

A specification of this improvement follows.

My invention relates to cultivators, and particularly to stub axle cultivators, the object of my invention being to provide an improved device of this character having the novel features hereinafter described and claimed.
In the accompanying drawing, Figure 1 is a rear elevation of a cultivator partly broken away, in which my invention is embodied in one form; Fig. 2 is a vertical section through a wheel and its axle bearing;
Fig. 3 is a perspective of the axle and shaft bearing; and Fig. 4 is a side elevation showing a drag bar and the method of adjusting the same.

In cultivators of the present type, the usual practice is to mount the wheel upon a stub axle pivoted to the frame and provided with means for swinging it on a vertical axis, whereby the direction of travel of the cultivator may be altered at will.
I have devised an improved axle attachment, comprising a sleeve which is mounted rotatably on the pendent arm of the main axle, and another sleeve which is cast integrally with the first-named one and is applied to the horizontal stub axle; I have also devised a means for lifting the drag-bars or cultivator beams, which includes chains that are slidably connected with them. The stub axles 10 are secured to the wheel hubs 11 and the main axle 13 has pendent or downwardly projecting parallel arms with which the stub axles are rotatably connected by my improved attachment comprising the horizontal sleeve 12 and vertical sleeve 18, the former having a foot-rest 14 on its inner end and the latter having a lateral arm 19 fixed on its upper end. This attachment is duplicated on the opposite sides of the cultivator. Thus the sleeves 12 receive and are adapted to rotate on the stub axles 10, while the vertical sleeves 18 are similarly mounted on the axle arms 13. The arms 19 of sleeves 18 are connected by the cross-bar 20. When the driver located on seat 15, presses with sufficient force on one of the foot-rests 14, the attachment of which it forms a part will be turned on the vertical axle arm as a pivot or fulcrum, and the bar 20 will pull the opposite attachment into corresponding position.

At the lower end of the pivot sleeve 18 I secure a clip 21 provided with an eye 22 to receive one end of the adjusting rod 23, the other end of which extends to the drag bar 24 and is adjustable lengthwise thereof, so that by varying the position of the rod 23 the sets of cultivator teeth 25 on opposite sides of the machine may be adjusted toward or away from each other.

To lift and lower the drag bars, I provide a lever 26 fast with the shaft 27 to the angled ends 28 of which I attach chains 29. At the lower ends of these I secure a clevis 30 which slides freely along the drag bar 24. By adjusting this clevis outward toward the end of the drag bar the leverage of the handle 26 is greatly increased and the bars may be readily lifted even with merely a boy's strength.

Various modifications of the structure illustrated will readily suggest themselves.

I claim as my invention:

In a wheeled cultivator, the combination with the frame, the drag-bars pivoted to said frame and carrying teeth or shovels, of a lever, a horizontally rotatable shaft to which said lever is attached, chains pendent from angle arms of said shaft, and having stirrups which are applied to, and freely slidable on, the drag-bars, as and for the purpose specified.

SAMUEL TERRY HUDSON.

Witnesses:
M. E. HUDSON,
CHAS. S. VAIL.

Copies of this patent may be obtained for five cents each, by addressing the "Commissioner of Patents, Washington, D. C."